United States Patent
Bauchot et al.

(10) Patent No.: US 8,011,014 B2
(45) Date of Patent: Aug. 30, 2011

(54) SYSTEM AND METHOD FOR PASSWORD VALIDATION BASED ON PASSWORD'S VALUE AND MANNER OF ENTERING THE PASSWORD

(75) Inventors: Frederic Bauchot, Saint-Jeannet (FR); Gerard Marmigère, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 11/254,648

(22) Filed: Oct. 20, 2005

(65) Prior Publication Data

US 2006/0136737 A1    Jun. 22, 2006

(30) Foreign Application Priority Data

Dec. 16, 2004    (EP) .................................... 04300903

(51) Int. Cl.
*G06F 7/04*    (2006.01)
*G06F 17/30*    (2006.01)
*G06F 21/00*    (2006.01)
*H04N 7/16*    (2011.01)
(52) U.S. Cl. .......................................... 726/28; 713/183
(58) Field of Classification Search ......................... None
See application file for complete search history.

(56) References Cited

U.S. PATENT DOCUMENTS

| | | |
|---|---|---|
| 5,060,263 A | 10/1991 | Bosen et al. |
| 5,204,966 A | 4/1993 | Wittenberg et al. |
| 5,485,519 A | 1/1996 | Weiss |
| 5,664,099 A | 9/1997 | Ozzie et al. |
| 6,079,021 A | 6/2000 | Abadi et al. |
| 6,817,519 B2 * | 11/2004 | Yasushi et al. ................ 235/379 |
| 7,243,239 B2 | 7/2007 | Kirovski et al. |
| 7,308,652 B2 | 12/2007 | Comfort et al. |
| 7,367,062 B2 | 4/2008 | Chang |
| 2002/0029341 A1 | 3/2002 | Juels et al. |

(Continued)

FOREIGN PATENT DOCUMENTS

WO    WO 03069490 A1 *    8/2003

OTHER PUBLICATIONS

USPTO Office Action (Mail Date Dec. 24, 2008) for U.S. Appl. No. 11/255,313, filed Oct. 20, 2005; Confirmation No. 7391.
Mar. 23, 2009 filed Amendment in response to USPTO Office Action (Mail Date Dec. 24, 2008) for U.S. Appl. No. 11/255, filed Oct. 20, 2005; Confirmation No. 7391.

(Continued)

*Primary Examiner* — Nasser Moazzami
*Assistant Examiner* — Trong Nguyen
(74) *Attorney, Agent, or Firm* — Schmeiser, Olsen & Watts; John Pivnichny

(57) ABSTRACT

A method and system for password validation. A user identifier (ID) and a user keying password are received from a user in conjunction with reception of a request from the user to obtain access to an application. The user keying password is a sequence of characters including at least one character from a first set of characters and at least one character from a second set of characters. The first set of characters are text characters allowed for defining a user password. The second set of characters are keying characters not allowed for defining a user password. It is determined whether the received user keying password matches a keying password reference. The keying password reference is based on a password definition rule.

15 Claims, 3 Drawing Sheets

U.S. PATENT DOCUMENTS

| | | | |
|---|---|---|---|
| 2003/0191947 A1 | 10/2003 | Stubblefield et al. | |
| 2004/0025026 A1 | 2/2004 | Karp et al. | |
| 2004/0054929 A1 | 3/2004 | Serpa | |
| 2004/0073809 A1* | 4/2004 | Wing Keong | 713/201 |
| 2004/0168068 A1* | 8/2004 | Goal et al. | 713/184 |
| 2005/0149762 A1 | 7/2005 | Smith et al. | |
| 2005/0160297 A1* | 7/2005 | Ogawa | 713/202 |
| 2006/0156016 A1 | 7/2006 | Tanaka | |

OTHER PUBLICATIONS

USPTO Notice of Allowance (Mail Date Jun. 12, 2009) for U.S. Appl. No. 11/255,313, filed Oct. 20, 2005; Confirmation No. 7391.

USPTO Notice of Abandonment (Mail Date Oct. 16, 2009) for U.S. Appl. No. 11/255,313, filed Oct. 20, 2005; Confirmation No. 7391. Failure to pay issue fee.

* cited by examiner

SYSTEM AND METHOD FOR PASSWORD VALIDATION BASED ON PASSWORD'S VALUE AND MANNER OF ENTERING THE PASSWORD

BACKGROUND OF THE INVENTION

1. Technical Field

The present invention relates generally to computer system security, and more particularly to a system and method to check user password validity when accessing computer system resources.

2. Related Art

Prompting a user password controls access of a user to many different types of computer resources. Entry of a password may be required to log-on to a network or a host, to open a standalone application, or to access certain data. Entry of a correct password may be sufficient to grant a user access to a data processing system. Alternatively, the user may be known to the data processing system by a unique userid (ID) and that unique userid may have a unique password associated with it. To gain access to the data processing system, the user first enters the user's userid and then enters the user's password. A scenario for specifying a userid and a password is shown in FIG. 1, in accordance with the prior art.

A user 101 interacts with a computer system 100 comprising an output device 102 (typically, a display), an input device 103 (typically, a keyboard and/or a pointing mouse), a local software program called 'agent' 104 to handle the password exchange between the input device 103 or the output device 102 and an application to be accessed, and a software program called 'application' 105 that the user requests to access.

In a first step 110, the user 101 issues a registration request towards the application 105 via the input device 103, and relayed by the agent 104.

In a second step 111, the application 105 prompts the user 101 for providing an identifier (denoted ID) and an associated password. This prompt is relayed by the agent 104 before being posted on the output device 102.

In a third step 112, the user 101 provides the required ID and password, still relying on the input device 103 and agent 104.

In a fourth step 113, the application 105 validates the received ID and password; e.g., through a reference table look-up.

In a fifth step 114, the application 105 grants registration to the user 101. This granting is relayed by the agent 104 before being posted on the output device 102.

Afterwards, a trusted user/application transaction 115 may follow this registration procedure.

In this scenario, the human-machine interaction 120 takes place between the user 101 and either the output device 102 (when the user is receiving information) or the input device 103 (when the user is providing information). In the later case, the retrieval of the data 121 specified by the user is done under the control of the agent 104 through the input device 103. Information retrieved by the agent 104 can afterwards be shared with the application 105, regardless of the fact that the agent and the application are proximate or not. In the typical case where the application is remote from the agent, security 122 is exposed between the agent 104 and the application 105, as eyes droppers may try to tap the agent-application information exchange.

A problem in the previous scenario, and more precisely at step 112, is that the exchange of the sensitive information (ID and password) from the agent 104 to the application 105 does not depend on the way the information has been retrieved by the agent 104, but only on the value of this information. Moreover, the verification 113 of the specified information is solely done by the application 105.

A consequence is that some password related information is not used to further validate the correctness of the ID and password and that the information validation is done after the information exchange, which is subject to security risks.

Thus, there is a need for improving security associated with the validation of passwords.

SUMMARY OF THE INVENTION

The present invention provides a computer implemented method for password validation, said method comprising:

receiving a user identifier (ID) and a user keying password from a user in conjunction with reception of a request from the user to obtain access to an application, the user keying password being a sequence of characters comprising at least one character from a first set of characters and at least one character from a second set of characters, the first set of characters being text characters allowed for defining a user password, the second set of characters being keying characters not allowed for defining a user password; and determining whether the received user keying password matches a keying password reference, the keying password reference being based on a password definition rule.

The present invention provides a computer-implemented system for password validation, said computer system comprising:

means for receiving a user identifier (ID) and a user keying password from a user in conjunction with reception of a request from the user to obtain access to an application, the user keying password being a sequence of characters comprising at least one character from a first set of characters and at least one character from a second set of characters, the first set of characters being text characters allowed for defining a user password, the second set of characters being keying characters not allowed for defining a user password; and means for determining whether the received user keying password matches a keying password reference, the keying password reference being based on a password definition rule.

The present invention provides a computer program product, comprising a computer usable medium having a computer readable program that when executed on a computer causes the computer to perform a method for password validation, said method comprising:

receiving a user identifier (ID) and a user keying password from a user in conjunction with reception of a request from the user to obtain access to an application, the user keying password being a sequence of characters comprising at least one character from a first set of characters and at least one character from a second set of characters, the first set of characters being text characters allowed for defining a user password, the second set of characters being keying characters not allowed for defining a user password; and determining whether the received user keying password matches a keying password reference, the keying password reference being based on a password definition rule.

The present invention advantageously improves security associated with the validation of passwords.

DETAILED DESCRIPTION OF THE INVENTION

Figure 1:
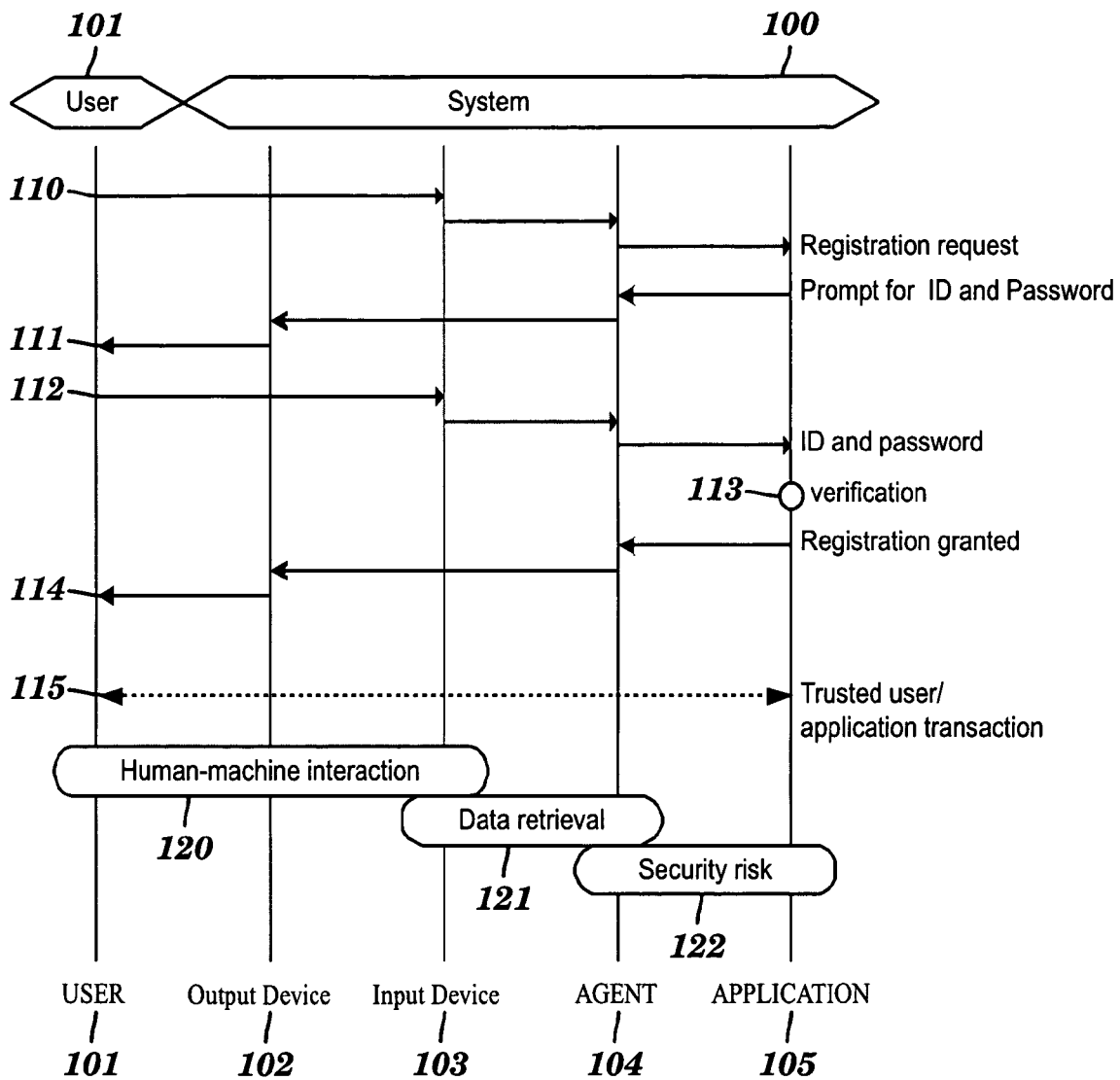
FIG. 1 is a general data flow exchange to specify a user ID and password to access a computer resource, in accordance with the prior art.

A method for checking the validity of a user password is disclosed. The method operates in a computer system environment wherein password definition rules including a first set of characters (text characters) allowed for defining a user password and second set of characters (keying characters) not allowed for defining a user password are established. Upon reception of a user request to get access to an application, the user is prompted to enter a user identifier (ID) and a user keying password, the user keying password being a sequence comprising the first set of and the second set of characters. Verification is made that the user enters the user keying password in the way defined by a user keying password reference. A checking of the user identifier and the user password against an identifier/password reference is then made. The user password is the sequence of the first set of characters of the user keying password. Finally, access is granted to the application if the user ID and the user password match the identifier/password reference; otherwise access is denied.

The present invention provides a method and system for proofing the identity of a user through enhanced password validation.

The present invention validates a user specified password by taking into account the way the password has been specified on top of the password value.

The present invention defines a formal representation of the way a user specifies a password.

The present invention defines a method aimed to record and validate the way a password has been specified by a user, against a predefined reference.

The present invention defines a protocol based on the exchange of messages to allow an application party to receive from an agent party a password along with a proof that the way the password has been specified is as expected.

The present invention provides a method for checking the validity of a user password.

The method of the present invention operates in a computer system environment having password definition rules including a first set of characters ("text characters") allowed for defining a user password and a second set of characters ("keying characters") not allowed for defining a user password. Thus a character of a password definition rule comprises at least one text character and at least one keying character.

A "text character", such as an alphanumeric character, is a character that when selected is embodied as a generated character shape (e.g., "a", "Z", "9"). For a keyboard, examples of a "text character" includes "a", "Z", "9", "%", etc. A text character of a keyboard is selected or keyed by depressing the corresponding key of the keyboard.

A "keying character" is a non text character (i.e., not a text character) and denotes a state of a user-controlled element of an input device. For a keyboard, examples of keying characters include the Caps Lock key, the Control (Ctrl) key, etc. A keying character of a keyboard is selected or keyed by depressing the corresponding key of the keyboard. For a mouse, examples of keying characters include the presence of the mouse above the cursor, the presence of the mouse below the cursor, the presence of the mouse to the right of the cursor, and the presence of the mouse to the left of the cursor. A keying characters of a mouse is selected by moving the mouse to the position associated with the keying character (e.g., above the cursor) or leaving the mouse in place if the mouse is already at the position of the keying character.

Upon reception of a user request to get access to an application, the user is prompted to provide a user identifier and a user keying password, the user keying password being a sequence of characters chosen from the first and the second sets. Thus, the user keying password is entered in accordance with a password definition rule. The received user keying password is then checked against a keying password reference. If the user keying password matches a character string determined by a password definition rule specified in the keying password reference, then the user identifier and the user password are next checked against an identifier/password reference, the user password being the sequence of characters of the user keying password chosen from the first set. Access to the application is granted if the user identifier and the user password match the identifier/password reference; otherwise access is denied.

In a commercial form, computer readable program means allowing a computer machine to perform the method of the present invention are embodied on a program storage device that is readable by the computer machine.

The present invention takes advantage of two characteristics: (1) a password is not only characterized by its value, but also by the way this value is specified, with respect to the different input devices available to the user; and (2) password validation is not only done by the entity granting the user registration (i.e., the application entity 105 in the former scenario), but also by the entity interacting with the user for password exchange (i.e., the agent entity 104 in the former scenario).

For clarifying the description, the term "password keying" (or PK for short) is used in the description herein to represent the way the password is specified by the user 101 to the input device 103. This PK relates clearly to the nature of the input device used to specify the password, such as a keyboard, a pointing device like a mouse or a graphical tablet, etc.

Figure 2:
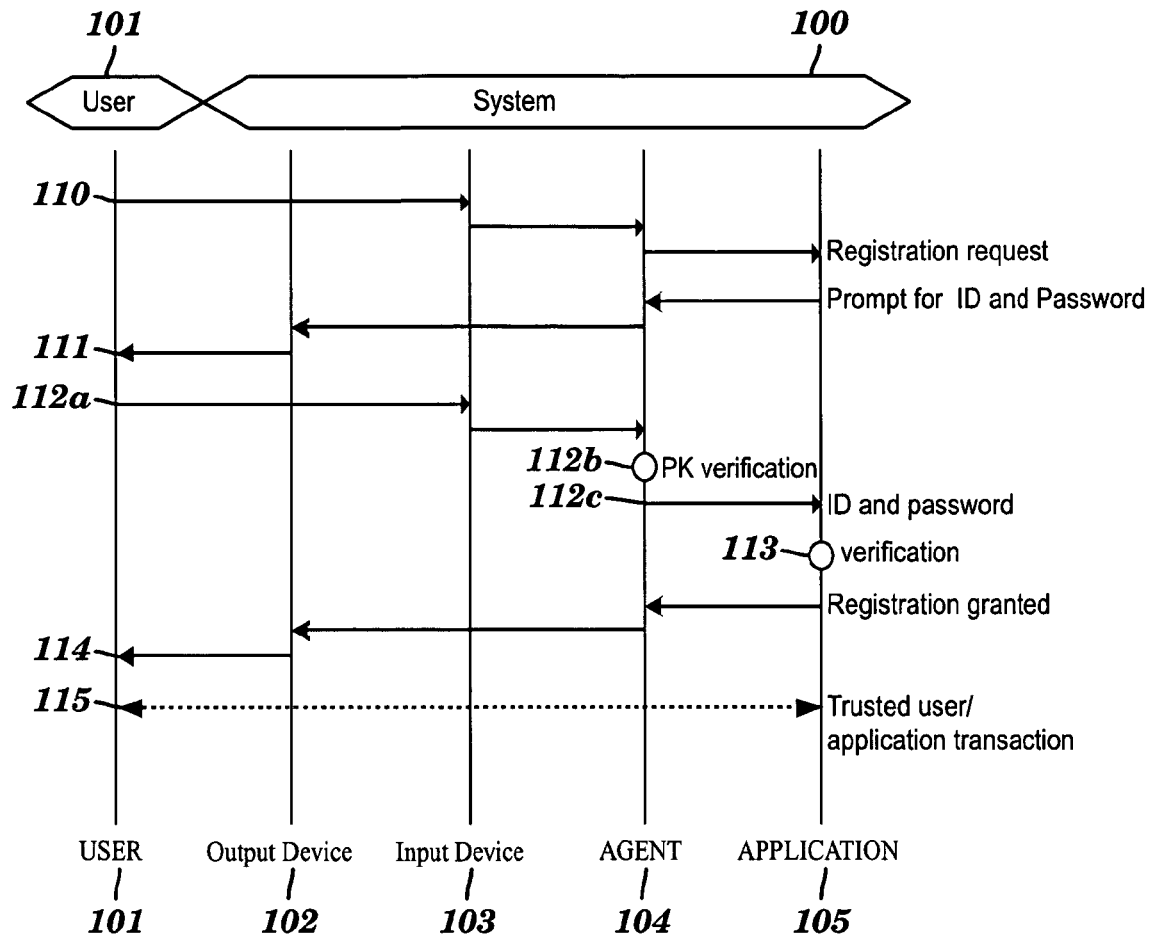
FIG. 2 is a general data flow exchange to specify a user ID and password to access a computer resource, in accordance with the present invention.

According to the proposed invention, the new password validation scenario is illustrated on FIG. 2, in accordance with the present invention. Initial steps 110 and 111 remain identical as those previously described for FIG. 1. Step 112 of FIG. 1 is divided in FIG. 2 into three steps: 112*a*, 112*b*, and 112*c*.

In step 112*a*, the user 101 specifies the information to the agent 104 through the input device 103. The user-specified information includes a user ID and a user keying password. The agent 104 then validates the keying by checking for each character of the user keying password. This local validation of the keying is done by checking the user keying password against a known keying password reference that has been previously entered by the user at the time of password definition and passed to the agent 104.

In step 112*b*, a verification is done by the agent 104 to verify that all characters of the user keying password have been entered correctly. At the end of password keying, if all the characters have been entered in the way described by the keying password reference, then a last step 112*c* is followed. Otherwise the user 101 is notified that the password was incorrectly specified (although its value may be valid).

In step 112*c*, the application 105 receives the user ID and password specified by the user 101.

The further steps 113 to 115 remain identical to those previously described for FIG. 1.

The inventors have taken advantage for the Password Keying representation of the fact that, as a general rule, passwords do not authorize the use of any possible character. Some of those forbidden/unused characters ("keying characters") are used in the invention and dedicated to specify some user actions on the input device and are not translated into password character generation. Those unused characters are environment and implementation dependent and are only to be considered as examples in the following description, knowing that other different but equivalent choices are possible, without departing from the spirit of the present invention.

In the following description, it will be assumed that the first set of characters allowed for a password are the alphanumeric characters: a-z; A-Z; and 0-9. Should other characters be also valid, then the following rules apply.

The PK is represented as a character string, with the following conventions, which are relevant for an embodiment of the present invention, where the position of the pointing device (typically a mouse) constitutes the keying information:

"*" represents the keying of any single valid password character;

"?" represents the keying of any number of valid password characters;

"↑" represents the presence of the mouse above the cursor position;

"↓" represents the presence of the mouse below the cursor position;

"→" represents the presence of the mouse on the right of the cursor position;

"←" represents the presence of the mouse on the left of the cursor position.

With this characters definition, the following examples illustrate some possible PK specifications, where it is assumed that the base password is the following string: "one12two".

a PK="↑?" specifies that the user must keep the mouse above the cursor position, and only key the password ("one12two" in this example) as soon as prompted, without any other keying.

a PK="→**←?" specifies that the user must first position the mouse on the right of the cursor position, then key the two first password characters ("on" in this example), then position the mouse on the left of the cursor position, and finally key the rest of the password ("e12two" in this example).

In the above examples, the mouse has been used as the input device featuring keying information. However, it will be appreciated that the keyboard itself can also be used to define PK. The PK definition can also be completed with the following characters:

"¢" represents the keying of the Caps lock key;
"©" represents the keying of the Control key;
"$" represents the keying of the Shift key;
"<" represents the keying of the Back Space key;
"α" represents the keying of the Alternate key;
"." represents the keying of any single dummy alphanumeric character;

any alphanumeric character is discarded from the reference password; and the above rules may be further completed by others, according to the desired flexibility.

The sequence of characters specifies the PK, as illustrated in the following examples, where it is again assumed that the base password is the following string: "one12two".

PK="?" specifies that the user must only key the password ("one12two" in this example) as soon as prompted, without any other keying;

PK="**α?" specifies that the user must first key the two first password characters ("on" in this example), then key the Alternate key, and finally key the rest of the password ("e12two" in this example);

PK=".***" specifies that the user must key the password while inserting a dummy character in the third position before the last keyed character. In this example, the user can key, for example, "one123two" or "one12atwo";

PK="*A?d*" specifies that the user must key the password while inserting in second position a dummy "A" character, and in last minus one position another dummy "d" character. In this example, the user can key, for example, "oAne12twdo". This allows updating only a subset of a password.

Figure 3:
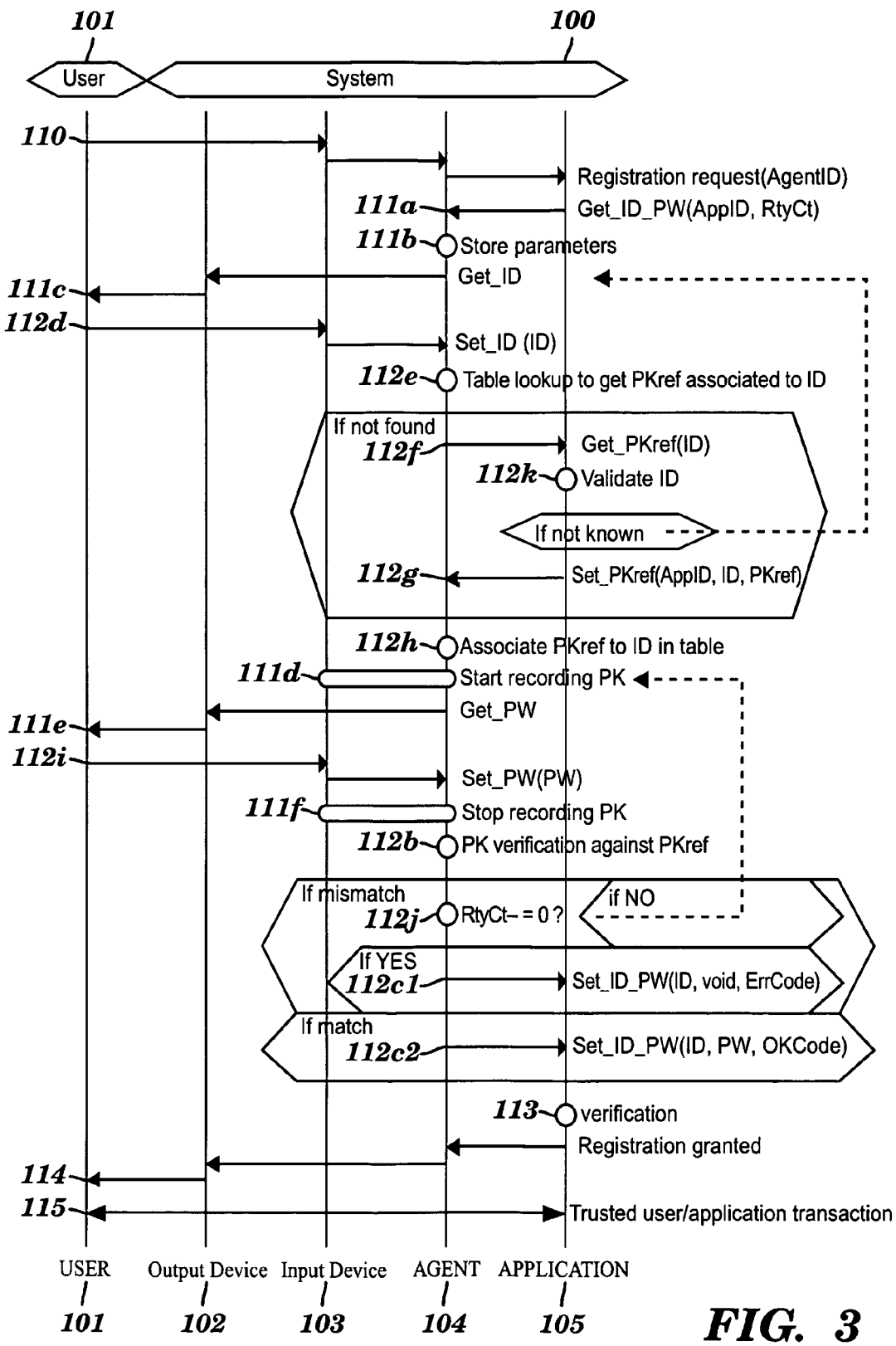
FIG. 3 is a detailed view of the data flow exchange of FIG. 2, in accordance with the present invention.

FIG. 3 describes the password keying validation on a more detailed and generic scenario addressing different conditions that could happen along the user ID and password exchange.

In step 110, the user 101 issues a registration request towards the application 105, built by the input device 103, and relayed by the agent 104.

In step 111a, the application 105 sends to the agent 104 a message in the form of Get_ID_PW(AppID,RtyCt) asking for identification and password of the user 101. The application 105 signs its identity through the parameter AppID, and further passes a parameter RtyCt later used in the scenario to limit the number of retries if the password keying verification fails.

In step 111b, the passed parameters AppID and RtyCt are stored in an internal memory of the agent computer system.

In step 111c, the agent 104 sends to the user 101 through the output device 102 a request to get the user identification. The user may be prompted on a display device in the form of a message Get_ID issued by the agent 104.

In step 112d, the user 101 uses the input device 103 to return to the agent 104 the user's identification, formally represented by a message Set_ID(ID) sent to the agent 104 in response to the Get_ID message.

In step 112e, the agent 104 performs a look-up in an internal table associated with the application identified by the parameter AppID, to find a record associated to a user identified by the parameter ID, and filled with a "keying password reference", named PKref. If this fails, then control is given to step 112f, otherwise control is given to step 111d.

In step 112f, the agent 104 sends to the application 105 a message Get_PKref(ID) to learn the PKref parameter associated to the user identified by the ID parameter (this information has not been found in the internal tables of the agent 104).

In step 112k, the application validates if the received ID is known. If it is the case, then the control is given to step 112g; otherwise control is given to step 111c.

In step 112g, the application 105 sends to the agent 104 a message Set_PKref(AppID, ID, PKref) in response to the former message.

In step 112h, the agent 104 updates the internal table associated with the application identified by the parameter AppID, within the record associated to the user identified by the parameter ID, by filling the reference for password keying field with the parameter PKref received at the previous step 112g.

In step 111d, the agent 104 interacts with the input device 103 to start recording the the keying of the next-to-come user specified information. For example, in the case where the input device is a conventional keyboard, recording the keying records every hit on any key of the keyboard. This recording operation is done according to the password keying representation previously described.

In step 111e, the agent 104 sends to the user 101 through the output device 102 a request to get the password. This can be as simple as displaying a user prompt on a display device, and is formally represented by a message Get_PW issued by the agent 104.

In step 112*i*, the user 101 uses the input device 103 to return to the agent 104 the user keying password, character by character. The user keying password characters have been entered and are then checked against the keying password reference PKref and the result is saved, formally represented by a message Set_PW(PW) sent to the agent 104 in response to the Get_PW message.

In step 111*f*, the agent 104 interacts with the input device 103 to stop recording the keying of the user keying password. The keying recorded since the step 111*d* is represented by the parameter PK, and complies (as the reference PKref) with the password keying representation format specified in the previous section.

In step 112*b*, the agent 104 verifies if all the characters of the user keying password have been entered correctly according to the keying password reference PKref. If it is not the case (i.e., if the characters of the user keying password have not been entered correctly), then control is given to step 112*j*, otherwise control is given to step 112*c*2.

In step 112*j*, a retry parameter RtyCt is decremented and the resulting value is compared against zero. If found different from zero, then control is given back to step 111*d* for retrying password retrieval. If found equal to zero, then the maximum number of retries has been exhausted and control is given to step 112*c*1 for completing unsuccessfully the scenario.

In step 112*c*1, the agent 104 sends to the application 105 a message Set_ID_PW(ID, void, ErrCode) in response to the message received at step 111*a*. The parameter ErrCode specifies that the password keying has failed after having gone through the maximum number of retries, so that there is no password passed in this message (second parameter taking a default void value). The next step of the scenario is step 113.

In step 112*c*2, the agent 104 sends to the application 105 a message Set_ID_PW(ID, PW, OKCode) in response to the message received at step 111*a*. The parameter OKCode specifies that the password keying has been successfully passed, so that there is a password passed in this message (second parameter PW). The next step of the scenario is step 113.

In step 113, the application 105 validates the received ID and password, for instance through reference table look-up. The policies used to execute this step are beyond the scope of the present invention. If the validation step is positive, then next step is step 114 otherwise the scenario ends.

In step 114, the application 105 grants registration to the user 101. This granting is relayed by the agent 104 before being posted on the output device 102.

Afterwards in step 115, a trusted user/application transaction may follow this registration procedure.

It is to be noted that the previous scenario does not specifically address the policies followed to update the PKref parameter. This is considered to be outside of the scope of the present invention, and can be implemented by any conventional means, such as the ones currently used for password update management for example.

In an alternate embodiment, on step 111*a*, an optional PKref parameter (i.e. an updated keying password reference) could be added if the application 105 wants to take advantage of this message to pass to the Agent 104 an update of the PKref parameter. This alternative assumes that the application 105 comprises means to identify the current user 101 (for instance through other parameters that may have been passed in the registration request message 110). In this case, the scenario continues, but step 112*e* is replaced by step 112*h* to update the table that records the PKref.

What is claimed is:

1. A computer implemented method for password validation, said method comprising:

a computer of a computer system receiving a user identifier (ID) and a user keying password from a user in conjunction with reception of a request from the user to obtain access to an application, the user keying password consisting of a first character string and a base password for the user, wherein the first character string consists of at least two text characters from a set of text characters and at least one keying character from a set of keying characters, and wherein the base password for the user consists of a plurality of text characters of the set of text characters, the set of text characters consisting of text characters allowed for defining a password of the user, the set of keying characters consisting of non-text characters not allowed for defining the password of the user; and said computer determining that the first character string of the received user keying password matches a second character string determined by a password definition rule specified in a keying password reference, the keying password reference consisting of the password definition rule represented as a third character string consisting of at least two characters, each character in the third character string representing a subset of the user keying password and differing from each character in the base password and in the first character string, wherein at least one character in the third character string represents more than one text character of the plurality of text characters of the base password and fewer characters than the plurality of text characters of the base password, wherein said receiving the user keying password comprises receiving each text character of the at least one text character from depression by the user of a corresponding key of a hardware keyboard of the computer system and receiving each keying character of the at least one keying character from a hardware input device of the computer system, wherein each keying character of the at least one keying character denotes a state of a user-controlled element of the hardware input device, and wherein responsive to and after said determining that the first character string of the user keying password matches the second character string determined by the password definition rule specified in the keying password reference, the method further comprises:

said computer ascertaining by the application that the user ID and a user password respectively match a reference ID and a reference password, said user password consisting of the text characters in the user keying password, said text characters in the user password sequenced according to a sequential ordering of the text characters in the user keying password, said text characters in the user password comprising the plurality of text characters of the base password; and responsive to said ascertaining, said computer granting access to the application.

2. The method of claim 1, wherein the hardware input device is the hardware keyboard.

3. The method of claim 1, wherein the hardware input device is a mouse.

4. The method of claim 1, wherein the at least two characters in the third character string comprise a character that represents a keying of a single dummy alphanumerical character, and wherein the user password comprises the plurality of text characters of the base password and the single dummy alphanumerical character.

5. The method of claim 1, wherein the at least two characters in the third character string comprise a character that represents a keying of a special key selected from the group consisting of a Caps Lock key, a Control key, a Shift key, a Back Space key, and an Alternate key.

6. A computer program product, comprising a physically tangible program storage device storing a computer readable program that when executed on a computer of a computer system implements a method for password validation, said method comprising:

said computer receiving a user identifier (ID) and a user keying password from a user in conjunction with reception of a request from the user to obtain access to an application, the user keying password consisting of a first character string and a base password for the user, wherein the first character string consists of at least two text characters from a set of text characters and at least one keying character from a set of keying characters, and wherein the base password for the user consists of a plurality of text characters of the set of text characters, the set of text characters consisting of text characters allowed for defining a password of the user, the set of keying characters consisting of non-text characters not allowed for defining the password of the user; and said computer determining that the first character string of the received user keying password matches a second character string determined by a password definition rule specified in a keying password reference, the keying password reference consisting of the password definition rule represented as a third character string consisting of at least two characters, each character in the third character string representing a subset of the user keying password and differing from each character in the base password and in the first character string, wherein at least one character in the third character string represents more than one text character of the plurality of text characters of the base password and fewer characters than the plurality of text characters of the base password, wherein said receiving the user keying password comprises receiving each text character of the at least one text character from depression by the user of a corresponding key of a hardware keyboard of the computer system and receiving each keying character of the at least one keying character from a hardware input device of the computer system, wherein each keying character of the at least one keying character denotes a state of a user-controlled element of the hardware input device, and wherein responsive to and after said determining that the first character string of the user keying password matches the second character string determined by the password definition rule specified in the keying password reference, the method further comprises:

said computer ascertaining by the application that the user ID and a user password respectively match a reference ID and a reference password, said user password consisting of the text characters in the user keying password, said text characters in the user password sequenced according to a sequential ordering of the text characters in the user keying password, said text characters in the user password comprising the plurality of text characters of the base password; and responsive to said ascertaining, said computer granting access to the application.

7. The computer program product of claim 6, wherein the hardware input device is the hardware keyboard.

8. The computer program product of claim 6, wherein the hardware input device is a mouse.

9. The computer program product of claim 6, wherein the at least two characters in the third character string comprise a character that represents a keying of a single dummy alphanumerical character, and wherein the user password comprises the plurality of text characters of the base password and the single dummy alphanumerical character.

10. The computer program product of claim 6, wherein the at least two characters in the third character string comprise a character that represents a keying of a special key selected from the group consisting of a Caps Lock key, a Control key, a Shift key, a Back Space key, and an Alternate key.

11. A computer system comprising a computer and a physically tangible program storage device storing a computer readable program that when executed on the computer implements a method for password validation, said method comprising:

said computer receiving a user identifier (ID) and a user keying password from a user in conjunction with reception of a request from the user to obtain access to an application, the user keying password consisting of a first character string and a base password for the user, wherein the first character string consists of at least two text characters from a set of text characters and at least one keying character from a set of keying characters, and wherein the base password for the user consists of a plurality of text characters of the set of text characters, the set of text characters consisting of text characters allowed for defining a password of the user, the set of keying characters consisting of non-text characters not allowed for defining the password of the user; and said computer determining that the first character string of the received user keying password matches a second character string determined by a password definition rule specified in a keying password reference, the keying password reference consisting of the password definition rule represented as a third character string consisting of at least two characters, each character in the third character string representing a subset of the user keying password and differing from each character in the base password and in the first character string, wherein at least one character in the third character string represents more than one text character of the plurality of text characters of the base password and fewer characters than the plurality of text characters of the base password, wherein said receiving the user keying password comprises receiving each text character of the at least one text character from depression by the user of a corresponding key of a hardware keyboard of the computer system and receiving each keying character of the at least one keying character from a hardware input device of the computer system, wherein each keying character of the at least one keying character denotes a state of a user-controlled element of the hardware input device, and wherein responsive to and after said determining that the first character string of the user keying password matches the second character string determined by the password definition rule specified in the keying password reference, the method further comprises:

said computer ascertaining by the application that the user ID and a user password respectively match a reference ID and a reference password, said user password consisting of the text characters in the user keying password, said text characters in the user password sequenced according to a sequential ordering of the text characters in the user keying password, said text characters in the user password comprising the plurality of text characters of the base password; and responsive to said ascertaining, said computer granting access to the application.

12. The computer system of claim 11, wherein the hardware input device is the hardware keyboard.

13. The computer system of claim 11, wherein the hardware input device is a mouse.

14. The computer system of claim 11, wherein the at least two characters in the third character string comprise a character that represents a keying of a single dummy alphanumerical character, and wherein the user password comprises the plurality of text characters of the base password and the single dummy alphanumerical character.

15. The computer system of claim 11, wherein the at least two characters in the third character string comprise a character that represents a keying of a special key selected from the group consisting of a Caps Lock key, a Control key, a Shift key, a Back Space key, and an Alternate key.

* * * * *